(12) United States Patent
Grimaldo et al.

(10) Patent No.: US 11,697,330 B2
(45) Date of Patent: Jul. 11, 2023

(54) PERIMETER FRAME FOR A SUNSHADE MODULE

(71) Applicant: Aisin Technical Center of America, Inc., Northville, MI (US)

(72) Inventors: Jacob Grimaldo, Westland, MI (US); Micah Wedekind, Livonia, MI (US); Michael Mixon, Brighton, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 0 days.

(21) Appl. No.: 17/534,932

(22) Filed: Nov. 24, 2021

(65) Prior Publication Data

US 2023/0158869 A1   May 25, 2023

(51) Int. Cl.
| | | |
|---|---|---|
| *B60J 7/00* | (2006.01) | |
| *B60J 7/057* | (2006.01) | |
| *B60J 7/043* | (2006.01) | |

(52) U.S. Cl.
CPC ............. *B60J 7/0007* (2013.01); *B60J 7/043* (2013.01); *B60J 7/0573* (2013.01)

(58) Field of Classification Search
CPC ...... B60J 7/0015; B60J 7/0007; B62D 27/023
USPC .............................................. 296/214, 29, 30
See application file for complete search history.

(56) References Cited

U.S. PATENT DOCUMENTS

| | | |
|---|---|---|
| 4,763,949 A | 8/1988 | Haig |
| 4,893,866 A | 1/1990 | Dowd et al. |
| 6,644,728 B1 * | 11/2003 | Nagashima ............. B60R 13/07 296/213 |
| 6,824,185 B2 | 11/2004 | Tiesler et al. |
| 6,926,333 B2 | 8/2005 | Sturt |
| 7,441,833 B1 * | 10/2008 | Pomeroy .................. B60J 7/022 296/214 |
| 7,527,328 B2 | 5/2009 | Reitzloff et al. |
| 7,905,542 B2 | 3/2011 | Marx et al. |
| 8,292,359 B2 * | 10/2012 | Maruyama ............... B60J 7/022 296/223 |
| 8,398,161 B2 | 3/2013 | Kirchen et al. |
| 8,899,671 B2 | 12/2014 | Huelke |

(Continued)

FOREIGN PATENT DOCUMENTS

DE         102008045574 A1      3/2010

OTHER PUBLICATIONS

Audi, Audi A4 Sunroof. Clip. Headliner., Aug. 6, 2021.

(Continued)

*Primary Examiner* — Dennis H Pedder
(74) *Attorney, Agent, or Firm* — Christopher G. Darrow; Darrow Mustafa PC (57) ABSTRACT

A perimeter frame for a sunshade module includes a sunshade opening, a guiderail, and a housing. The guiderail includes an end face, and a guideway, a mounting flange, and an attachment channel extending therefrom. The guideway opens inwardly to the sunshade opening, the mounting flange projects outwardly away from the sunshade opening, and the attachment channel opens downwardly from therebetween. The housing includes a guiderail adaptor. The guiderail adaptor is inserted into the attachment channel, secured to the attachment channel using a fastener installed from above the attachment channel, and engages the attachment channel from below.

20 Claims, 4 Drawing Sheets

(56) References Cited

U.S. PATENT DOCUMENTS

| | | | | |
|---|---|---|---|---|
| 8,915,542 B2 * | 12/2014 | Kanai | ...................... | B60J 10/82 |
| | | | | 296/216.06 |
| 9,340,096 B2 | 5/2016 | Bojanowski | | |
| 10,300,863 B1 | 5/2019 | Vemulapati et al. | | |
| 2020/0062196 A1 | 2/2020 | Forgette et al. | | |

OTHER PUBLICATIONS

Parts Mix, Headliner "C" Clip, Aug. 6, 2021.
Legendary Auto Interiors, Headliner Retaining Clip, Aug. 6, 2021.

* cited by examiner

PERIMETER FRAME FOR A SUNSHADE MODULE

TECHNICAL FIELD

The embodiments disclosed herein relate to sunshade modules for vehicles equipped with sunroofs and, more particularly, to perimeter frames for sunshade modules.

BACKGROUND

Sunroofs are common equipment on many new vehicles. In association with their sunroofs, some new vehicles are equipped with sunshade modules. The sunshade modules commonly include perimeter frames that define sunshade openings, sunshades corresponding to the sunshade openings, and drive systems for the sunshades. The perimeter frames commonly include guiderails for the sunshades and housings for the drive systems.

In these sunshade modules, as part of the perimeter frames, the housings are connected to the guiderails. The guiderails commonly include guideways and mounting flanges. As a matter of convenience for vehicle manufacturers, the guiderails may also include attachment channels that allow the attachment of headliners to the guiderails. With existing configurations contemplating securing the housings to the mounting flanges, the addition of the attachment channels creates challenges with respect to connecting the housings to the guiderails.

SUMMARY

Disclosed herein are embodiments of a perimeter frame for a sunshade module. In one aspect, a perimeter frame for a sunshade module includes a sunshade opening, a guiderail, and a housing. The guiderail includes an end face, and a guideway, a mounting flange, and an attachment channel extending therefrom. The guideway opens inwardly to the sunshade opening, the mounting flange projects outwardly away from the sunshade opening, and the attachment channel opens downwardly from therebetween. The housing includes a guiderail adaptor. The guiderail adaptor is inserted into the attachment channel, secured to the attachment channel using a fastener installed from above the attachment channel, and engages the attachment channel from below.

In another aspect, a perimeter frame for a sunshade module includes a sunshade opening, a guiderail, and a housing. The guiderail includes an end face, and a guideway, a mounting flange, and an attachment channel extending therefrom. The guideway opens inwardly to the sunshade opening, the mounting flange projects outwardly away from the sunshade opening, and the attachment channel opens downwardly from therebetween. The housing includes a guiderail adaptor. The guiderail adaptor bifurcately projects past the end face to overlap the attachment channel and the mounting flange, and is secured to the attachment channel and the mounting flange.

In yet another aspect, a perimeter frame for a sunshade module includes a sunshade opening, a guiderail, and a housing. The guiderail includes an end face, and a guideway, a mounting flange, and an attachment channel extending therefrom. The guideway opens inwardly to the sunshade opening, the mounting flange projects outwardly away from the sunshade opening, and the attachment channel opens downwardly from therebetween. The housing includes a guiderail adaptor. The guiderail adaptor includes a base, and a first bracket and a second bracket projecting therefrom. The base is advanced to the end face. The first bracket and the second bracket are respectively inserted into the attachment channel and disposed atop the mounting flange, secured to the attachment channel and the mounting flange, and engage the attachment channel from below and the mounting flange from above.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a sunshade module for a vehicle equipped with a sunroof. The sunshade module includes a perimeter frame that defines a sunshade opening, a sunshade corresponding to the sunshade opening, and a drive system for the sunshade. The perimeter frame includes a sunshade opening, guiderails for the sunshade, and housings for the drive system.

As part of the perimeter frame, the housings are connected to the guiderails. In addition to guideways and mounting flanges, as a matter of convenience for vehicle manufacturers, the guiderails include attachment channels that allow the attachment of a headliner to the guiderails. With existing configurations contemplating securing the housings to the mounting flanges, the addition of the attachment channels creates challenges with respect to connecting the housings to the guiderails.

According to this disclosure, the perimeter frame includes adaptor-based configurations for connecting the housings to the guiderails. Among other aspects of the adaptor-based configurations, the housings include guiderail adaptors for the guiderails. To connect the housings to the guiderails, the guiderail adaptors are secured to the guiderails. Compared to existing configurations that contemplate securing the housings to the mounting flanges, the guiderail adaptors are advantageously secured to not only the mounting flanges, but also the attachment channels. As explained in additional detail below, the guiderail adaptors advantageously promote both retaining the extruded constructions of the guiderails and maintaining the sizes of the guiderails, and at the same time, advantageously stably connect the housings to the guiderails.

Figure 1A:
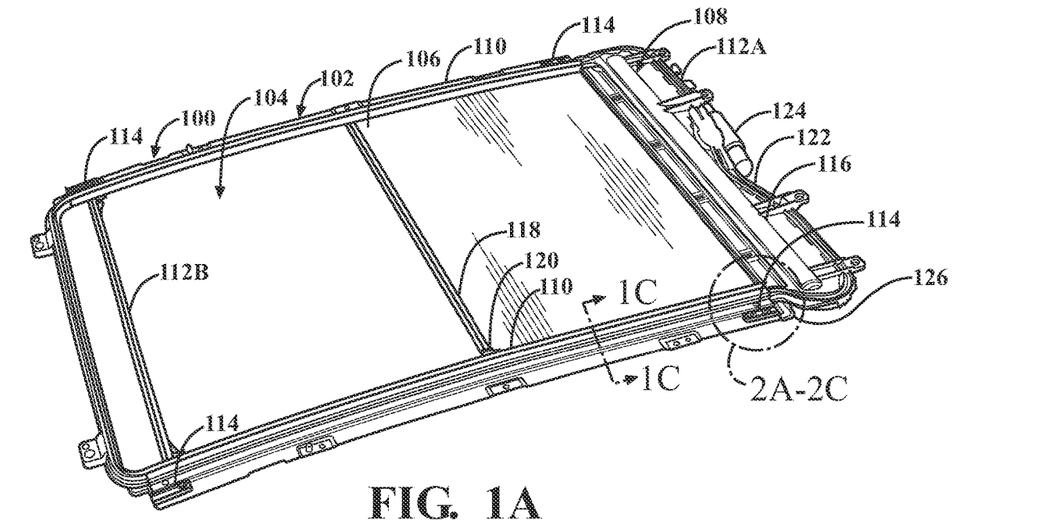
FIG. 1A is a perspective view of a sunshade module, showing a perimeter frame that defines a sunshade opening, a sunshade corresponding to the sunshade opening, and a drive system for the sunshade.

A sunshade module 100 for a vehicle equipped with a sunroof is shown in FIG. 1A. In this description, uses of "front," "forward," and the like, and uses of "rear," "rearward," and the like refer to the corresponding longitudinal directions of the vehicle and the sunshade module 100. "Front," "forward," and the like refer to the front (fore) of the vehicle and the sunshade module 100, while "rear," "rearward," and the like refer to the back (aft) of the vehicle and the sunshade module 100. Uses of "transverse," "inner," "inward," "outer," "outward," and the like refer to the corresponding lateral directions of the vehicle and the sunshade module 100. Uses of "above," "below," and the like refer to the corresponding vertical directions of the vehicle and the sunshade module 100.

With a configuration typical of passenger vehicles, the vehicle will include an exterior and a number of interior compartments. The compartments will include a passenger compartment, as well as an engine compartment, a cargo area, and the like. The vehicle will include a body that forms the exterior and defines the compartments. The body will include a horizontal roof, as well as two upright sides, a horizontal floor, and the like that define the passenger compartment. As part of the roof, the body will define a sunroof opening that opens between the passenger compartment and the exterior and include a transparent sunroof corresponding to the sunroof opening. The sunroof may include one or more transparent sunroof panels, and may have any combination of a panoramic configuration or a non-panoramic configuration and a stationary configuration or a movable configuration.

The sunshade module 100 includes a perimeter frame 102 that defines a sunshade opening 104 corresponding to the sunroof opening and a nontransparent or semitransparent sunshade 106 corresponding to the sunshade opening 104. Although the sunshade module 100, as shown, includes one sunshade 106, it will be understood that this disclosure is applicable in principle to otherwise similar sunshade modules 100 including multiple sunshades 106. During the assembly of the vehicle, the sunshade module 100 is mountable to the roof. To mount the sunshade module 100 to the roof, with the sunshade opening 104 aligned with the sunroof opening, the perimeter frame 102 is secured to the roof.

The perimeter frame 102 includes a rigid frame-like construction defining the sunshade opening 104. The sunshade 106 includes a flexible, rollable and unrollable, shade-like construction corresponding to the sunshade opening 104. The perimeter frame 102 supports the sunshade 106 for deployment relative to the sunshade opening 104 between an open configuration and a closed configuration through a range of partially-open configurations. As shown, the perimeter frame 102 supports the sunshade 106 for roll-up retraction from the closed configuration to the open configuration and roll-out extension from the open configuration to the closed configuration. In FIG. 1A, the sunshade 106 is shown in a representative partially-open configuration. In the open configuration, the sunshade 106 is positioned away from the sunshade opening 104 to allow sunlight into the passenger compartment through the sunroof. In the closed configuration, the sunshade 106 is positioned over the sunshade opening 104 to block sunlight from entering the passenger compartment through the sunroof.

In addition to the perimeter frame 102 and the sunshade 106, the sunshade module 100 includes a drive system 108 for the sunshade 106. The drive system 108 is mounted to, housed by, or otherwise supported by the perimeter frame 102. Moreover, the drive system 108 is connected between the perimeter frame 102 and the sunshade 106. The drive system 108 is operable to retract the sunshade 106, extend the sunshade 106, and otherwise deploy the sunshade 106 between the open configuration and the closed configuration.

In contemplation that the vehicle will be separately equipped with the sunroof and/or that the sunroof will have a stationary configuration, the sunshade module 100 may have a sunshade-only configuration. As shown, the sunshade module 100 is implemented as a standalone module, and the perimeter frame 102 and the drive system 108 are dedicated to the deployment of the sunshade 106. However, it will be understood that this disclosure is not exclusive to the sunshade-only configuration. For example, the sunshade module 100 may be implemented as a submodule of a sunroof assembly. In this example, the sunroof assembly may include both the sunshade module 100 and the sunroof. Accordingly, mounting the sunroof assembly to the roof may both mount the sunshade module 100 to the roof and equip the vehicle with the sunroof. For example, the sunroof may have a movable configuration. In this example, the sunroof may include one or more movable sunroof panels. Accordingly, the perimeter frame 102 may support the sunroof panels for movement between open positions and closed positions. Likewise, the drive system 108 may be operable to move the sunroof panels between the open positions and the closed positions.

Figure 1B:
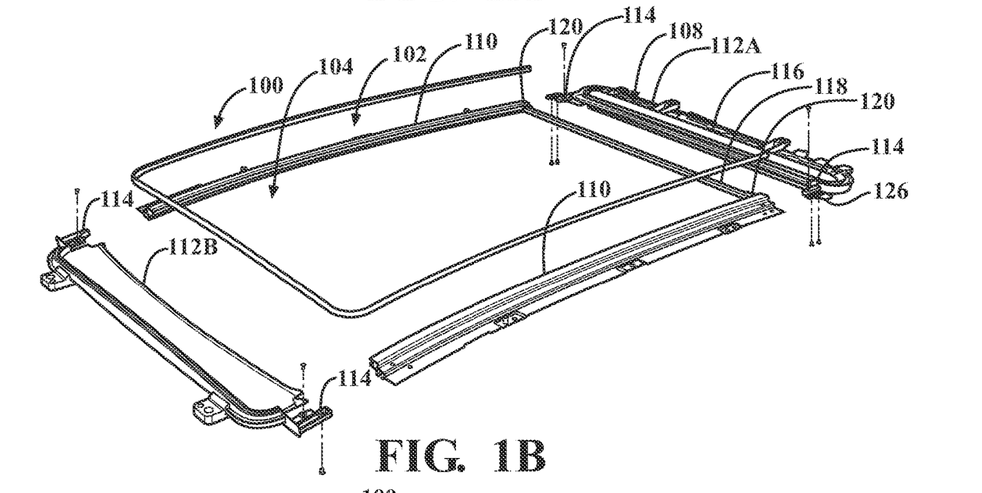
FIG. 1B is a partial assembly view of the sunshade module, showing aspects of the perimeter frame, including guiderails for the sunshade, and housings for the drive system that include guiderail adaptors for the guiderails.

As shown with additional reference to FIG. 1B, the perimeter frame 102 includes two elongate guiderails 110 for the sunshade 106 and two elongate housings 112 for the drive system 108. As shown, the housings 112 include a main housing 112A and an auxiliary housing 112B for the drive system 108. As part of the perimeter frame 102, the guiderails 110 and the housings 112 are arranged end-to-end. The guiderails 110 are laterally opposed from one another and extend longitudinally between the housings 112. The housings 112 are longitudinally opposed from one another and extend laterally between the guiderails 110. At the longitudinal ends of the guiderails 110 and the lateral ends of the housings 112, the housings 112 are connected to the guiderails 110. As explained in additional detail below, the perimeter frame 102 includes adaptor-based configurations for connecting the housings 112 to the guiderails 110. Among other aspects of the adaptor-based configurations, the housings 112 include guiderail adaptors 114 for the guiderails 110. To connect the housings 112 to the guiderails 110, the guiderail adaptors 114 are secured to the guiderails 110. For example, from the perspective of one housing 112 and one guiderail 110, the one housing 112 is secured to the one guiderail 110 by one guiderail adaptor 114. For example, from the perspective of one housing 112 and the two guiderails 110, the one housing 112 is secured to the two guiderails 110 by two guiderail adaptors 114. Both the guiderails 110 and the housings 112 are securable to the roof. To mount the sunshade module 100 to the roof, with the housings 112 connected to the guiderails 110, the guiderails 110 and the housings 112 are secured to the roof.

The drive system 108 includes a tensioner 116 and a crossbar 118 for the sunshade 106, two guides 120 for the crossbar 118, one or more cables 122 for the guides 120, and a motor 124 for the cables 122. The tensioner 116 and the crossbar 118 are longitudinally opposed from one another. The tensioner 116 is mounted to the main housing 112A and the crossbar 118 extends between the guiderails 110. The main housing 112A supports the tensioner 116 for rotation. The guiderails 110 support the crossbar 118 for movement therealong via the guides 120. More specifically, the guiderails 110 support the guides 120 for movement therealong, and the crossbar 118 is mounted to the guides 120. The motor 124 is mounted to the main housing 112A and the cables 122 extend along the guiderails 110 and the housings 112 between the guides 120 and the motor 124. During the deployment of the sunshade 106, the motor 124 is operable to move the crossbar 118 along the guiderails 110 via the cables 122 and the guides 120. More specifically, the guiderails 110 and the housings 112 support the cables 122 for movement therealong. Moreover, the cables 122 are connected to the guides 120 at the guiderails 110, and the motor 124 is connected to the cables 122 at the main housing 112A. The motor 124 is operable to move the cables 122 along the guiderails 110 and the housings 112. As the product of moving the cables 122 along the guiderails 110 and the housings 112, the motor 124 is operable to move the guides 120 along the guiderails 110 via the cables 122. And, as the product of moving the guides 120 along the guiderails 110 via the cables 122, the motor 124 is operable to move the crossbar 118 along the guiderails 110 via the guides 120.

The sunshade 106 is connected between the tensioner 116 and the crossbar 118. The tensioner 116 is rotatable in a rolling direction and an unrolling direction. The crossbar 118 is movable along the guiderails 110 toward the tensioner 116 and away from the tensioner 116. Moreover, the tensioner 116 is biased for rotation in the rolling direction. Acting against the crossbar 118, the bias for rotation in the rolling direction creates tension in the sunshade 106. In addition to facilitating the deployment of the sunshade 106, the tension in the sunshade 106 promotes an attractive taut appearance for the sunshade 106 in the closed configuration and the partially-open configurations. In general, the deployment of the sunshade 106 follows the movement of the crossbar 118 along the guiderails 110. Among other things, it follows that with the tensioner 116 being mounted to the main housing 112A, the retraction of the sunshade 106 is toward the main housing 112A, and the extension of the sunshade 106 is away from the main housing 112A. As shown, in a rearward-retraction and forward-extension implementation, the main housing 112A is rearward of the auxiliary housing 112B. Alternatively, in a forward-retraction and rearward-extension implementation, the main housing 112A may be forward of the auxiliary housing 112B.

In conjunction with the remainder of the drive system 108, the motor 124 is operable to retract the sunshade 106, extend the sunshade 106, and otherwise deploy the sunshade 106 between the open configuration and the closed configuration. To retract the sunshade 106, the motor 124 is operable to move the crossbar 118 along the guiderails 110 toward the tensioner 116. As the crossbar 118 moves along the guiderails 110 toward the tensioner 116, the bias for rotation in the rolling direction induces the tensioner 116 to rotate in the rolling direction against the tension in the sunshade 106. As the tensioner 116 rotates in the rolling direction, the sunshade 106 rolls onto the tensioner 116, and thereby assumes the open configuration. To extend the sunshade 106, the motor 124 is operable to move the crossbar 118 along the guiderails 110 away from the tensioner 116. As the crossbar 118 moves along the guiderails 110 away from the tensioner 116, the tension in the sunshade 106 induces the tensioner 116 to rotate in the unrolling direction against the bias for rotation in the rolling direction. As the tensioner 116 rotates in the unrolling direction, the sunshade 106 unrolls from the tensioner 116, and thereby assumes the closed configuration.

As part of the perimeter frame 102, the guiderails 110 and the housings 112 perform a number of basic functions with respect to the sunshade module 100. For example, both the guiderails 110 and the housings 112 guide the deployment of the sunshade 106. Compared to the guiderails 110, the housings 112 perform a number of additional basic functions. For example, in addition to guiding the deployment of the sunshade 106, the housings 112, whether individually or contributorily, support the drive system 108. Moreover, the housings 112 are connected to the guiderails 110. Moreover, the housings 112 provide access to the drive system 108. More specifically, with the tensioner 116 and the motor 124 mounted thereto, and the cables 122 extending in part therealong, the main housing 112A includes an underside access plate 126 for the drive system 108. Once the sunshade module 100 is mounted to the roof, the access plate 126 is removable from the remainder of the main housing 112A from below. In relation to their performance of these and other basic functions, while the housings 112 have relatively complex multipiece assembly constructions, the guiderails 110 have relatively straightforward extruded constructions. For example, the guiderails 110 may be made from one or more metallic materials suitable for extrusion, such as aluminum.

Figure 1C:
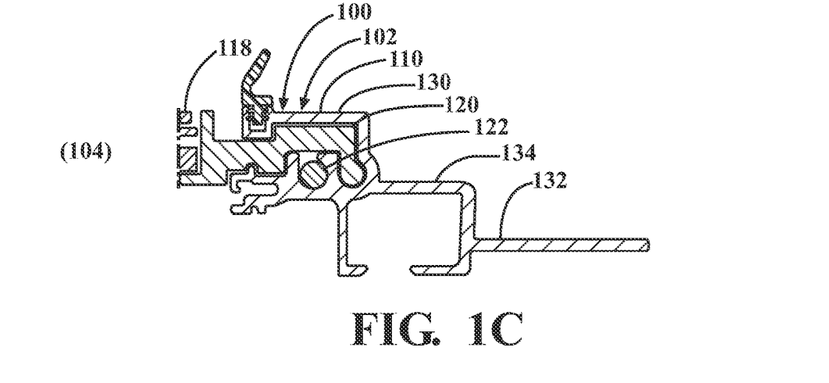
FIG. 1C is a cross-sectional view of the sunshade module taken along the line 1C-1C in FIG. 1A, showing aspects of a guiderail, including a guideway, a mounting flange, and an attachment channel.

As shown with additional reference to FIG. 1C, as a matter of convenience for vehicle manufacturers, the guiderails 110 also perform a supplemental function with respect to the vehicle. More specifically, once the sunshade module 100 is mounted to the roof, the guiderails 110 allow the attachment of a headliner to the guiderails 110. With respect to FIG. 1C, this description follows with reference to one representative guiderail 110. However, it will be understood that this disclosure is applicable in principle to the other guiderail 110.

As shown, the guiderail 110 includes a guideway 130 for a guide 120 and a cable 122, a mounting flange 132 for the roof, and an attachment channel 134 for a headliner. The guideway 130, the mounting flange 132, and the attachment channel 134 are oriented with the guiderail 110 and extend side-by-side along the guiderail 110. The guideway 130 and the mounting flange 132 are opposed from one another about the attachment channel 134. The guideway 130 is located inward toward the sunshade opening 104 and the mounting flange 132 is located outward away from the sunshade opening 104. The attachment channel 134 is located between the guideway 130 and the mounting flange 132, outward of the guideway 130 and inward of the mounting flange 132, and further inward toward the guideway 130 than the mounting flange 132. The guideway 130 opens inwardly to the sunshade opening 104 and is complementary to the guide 120 and the cable 122. The mounting flange 132 projects outwardly away from the sunshade opening 104 and is complementary to the roof. From between the guideway 130 and the mounting flange 132, the attachment channel 134 opens downwardly and is complementary to headliner attachments.

The guideway 130 supports the guide 120 and the cable 122 for movement along the guiderail 110. Moreover, the guideway 130 supports the guide 120 against pullout from the guiderail 110 toward the sunshade opening 104. As shown, the guideway 130 has a double-grooved cross-sectional shape. Correspondingly, the guideway 130 supports the guide 120 and the cable 122 for side-by-side movement along the guiderail 110. The mounting flange 132 is securable to the roof. Correspondingly, the guiderail 110 is securable to the roof by the mounting flange 132. The attachment channel 134 is configured to retentively receive headliner attachments from below. As shown, the attachment channel 134 has a lipped C-shaped cross-sectional shape.

Correspondingly, the attachment channel 134 is configured to retentively receive clips, snaps, X-mas tree fasteners, and like push-in headliner attachments typical of vehicles from below. To attach a headliner to the guiderail 110, with the headliner aligned with the roof, headliner attachments for the headliner are pushed into the attachment channel 134 from below.

As a matter of manufacturability, it is desirable to retain the extruded constructions of the guiderails 110. Compared to otherwise similar guiderails 110 that include the guideways 130 and the mounting flanges 132, from the perspective of the guiderails 110, their extruded constructions accommodate the addition of the attachment channels 134. However, from the perspective of the perimeter frame 102 as a whole, the addition of the attachment channels 134 creates challenges with respect to connecting the housings 112 to the guiderails 110.

As a matter of reliability, it is desirable to stably connect the housings 112 to the guiderails 110. As noted above, during the deployment of the sunshade 106, the motor 124 is operable to move the cables 122 along the guiderails 110 and the housings 112. Correspondingly, the motor 124 is operable to move the cables 122 between the guiderails 110 and the housings 112. The movement of the cables 122 therebetween creates moments between the guiderails 110 and the housings 112. With the guideways 130 supporting the cables 122 for movement along the guiderails 110, the moments between the guiderails 110 and the housings 112 are centered on the guideways 130. The moments between the guiderails 110 and the housings 112, while centered on the guideways 130, act on the connections of the housings 112 to the guiderails 110. With the housings 112 stably connected to the mounting flanges 132, the moments between the guiderails 110 and the housings 112 are counteracted.

As a matter of space optimization, despite the addition of the attachment channels 134, it is desirable to maintain the sizes of the guiderails 110. To connect the housings 112 to the guiderails 110, existing configurations contemplate securing the housings 112 to the mounting flanges 132. Accordingly, maintaining the sizes of the guiderails 110 creates the prospect of reliability drawbacks with respect to stably connecting the housings 112 to the guiderails 110. More specifically, with the sizes of the guiderails 110 maintained, the addition of the attachment channels 134 limits the available space for securing the housings 112 to the mounting flanges 132. It is contemplated that to increase the available space for securing the housings 112 to the mounting flanges 132, the attachment channels 134 may be partially removed from the longitudinal ends of the guiderails 110. However, partially removing the attachment channels 134 from the longitudinal ends of the guiderails 110 creates the prospect of manufacturability drawbacks with respect to retaining the extruded constructions of the guiderails 110.

Figure 2A:
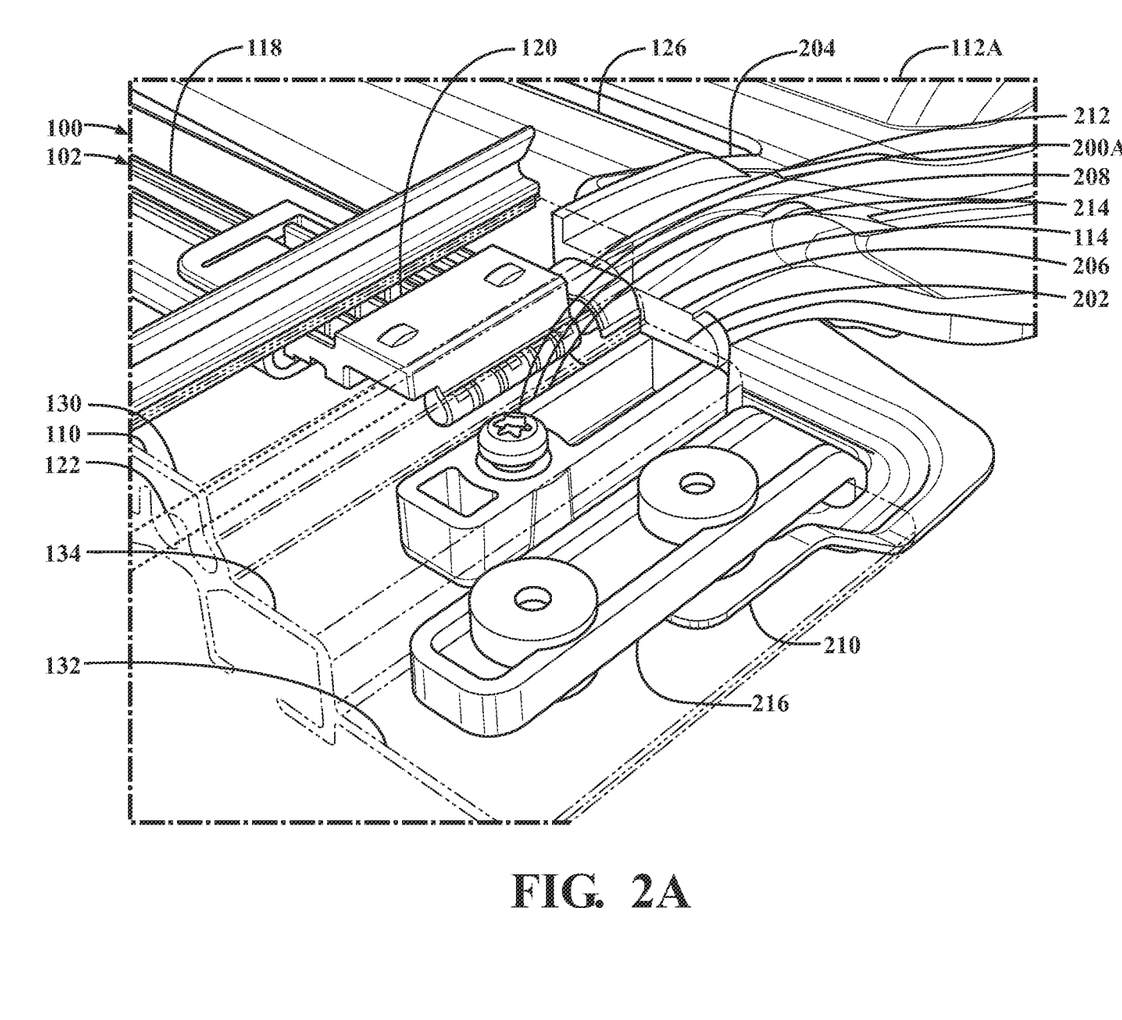
FIGS. 2A-2C are partial perspective views of the sunshade module, showing aspects of securing a housing to a guiderail by a guiderail adaptor, including securing the guiderail adaptor to an attachment channel and a mounting flange of the guiderail.
Figure 2B:
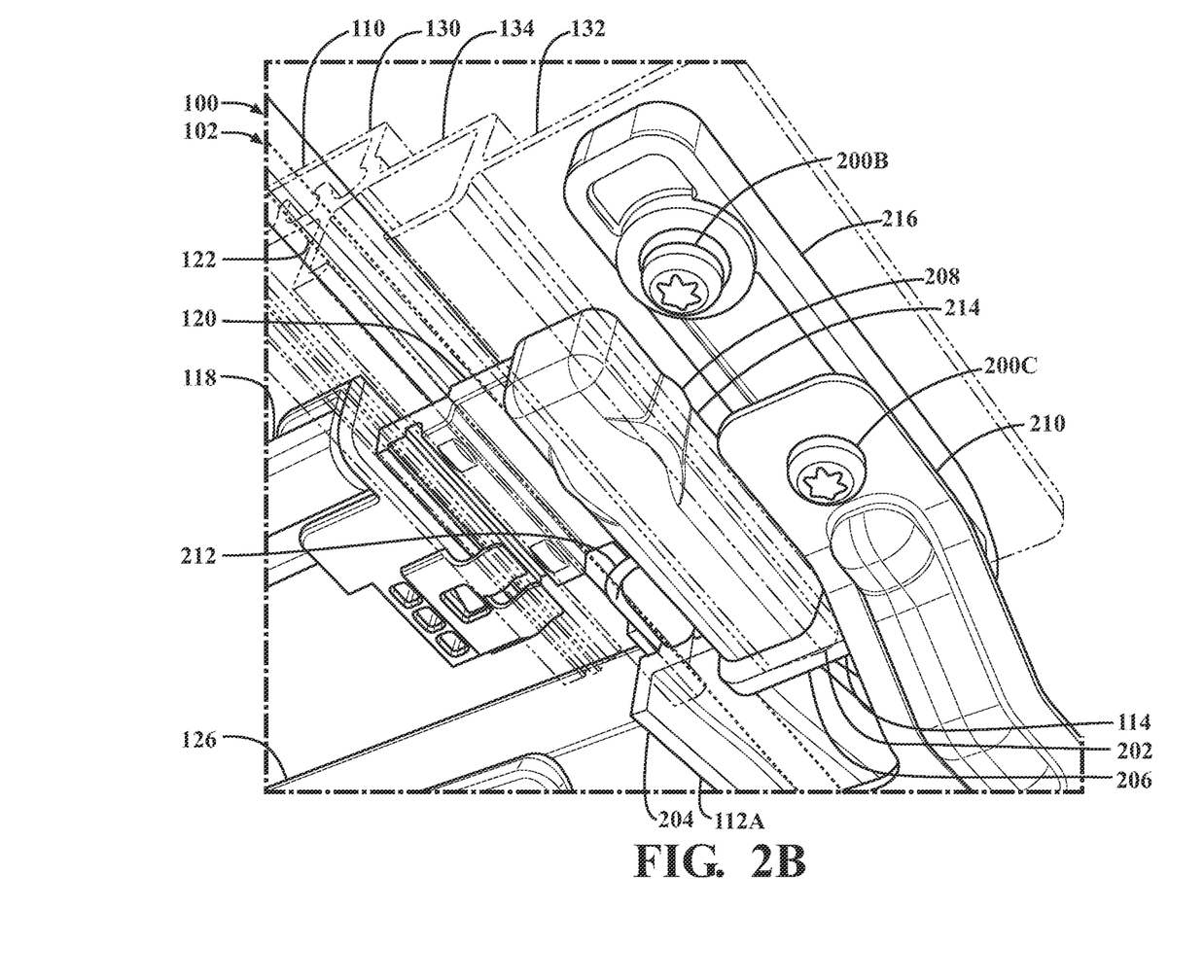
Figure 2C:
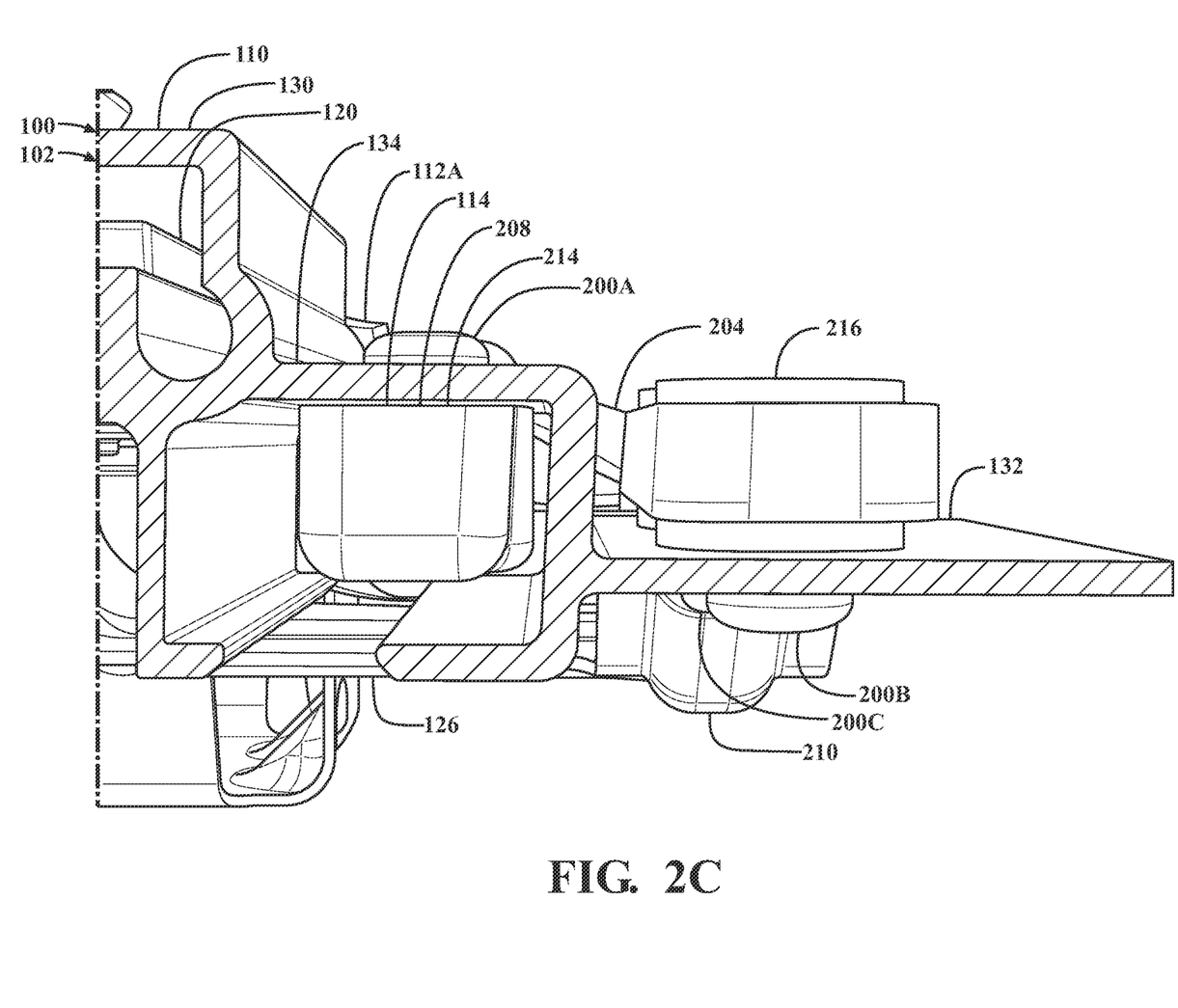

As noted above, the perimeter frame 102 includes adaptor-based configurations for connecting the housings 112 to the guiderails 110. Among other aspects of the adaptor-based configurations, to connect the housings 112 to the guiderails 110, the guiderail adaptors 114 are secured to the guiderails 110. As shown with additional reference to FIGS. 2A-2C, compared to existing configurations that contemplate securing the housings 112 to the mounting flanges 132, the guiderail adaptors 114 are advantageously secured to not only the mounting flanges 132, but also the attachment channels 134. As explained in additional detail below, the guiderail adaptors 114 advantageously promote both retaining the extruded constructions of the guiderails 110 and maintaining the sizes of the guiderails 110, and at the same time, advantageously stably connect the housings 112 to the guiderails 110. With respect to FIGS. 2A-2C, this description follows with reference to one representative guiderail 110, one representative housing 112, namely, the main housing 112A, and one representative guiderail adaptor 114. However, it will be understood that this disclosure is applicable in principle to the other guiderail 110, the other housing 112, namely, the auxiliary housing 112B, and the other guiderail adaptors 114.

As shown, as part of the adaptor-based configuration for connecting the main housing 112A to the guiderail 110, the perimeter frame 102 includes the guiderail 110 and the main housing 112A. As noted above, the guiderail 110 includes the guideway 130, the mounting flange 132, and the attachment channel 134, and the main housing 112A includes the guiderail adaptor 114 and the access plate 126. With respect to the guiderail adaptor 114, the perimeter frame 102 also includes a first fastener 200A for securing the guiderail adaptor 114 to the attachment channel 134 and a second fastener 200B for securing the guiderail adaptor 114 to the mounting flange 132. With respect to the access plate 126, the perimeter frame 102 also includes a third fastener 200C for securing the access plate 126 to the mounting flange 132 together with the guiderail adaptor 114.

At one longitudinal end, the guiderail 110 includes an end face 202. The end face 202 is oriented normally to the guiderail 110. As noted above, the guiderail 110 has an extruded construction. Accordingly, the guideway 130, the mounting flange 132, and the attachment channel 134 extend continuously along the guiderail 110. Correspondingly, the guiderail 110 has, and the end face 202 features, a compound cross-sectional shape corresponding to the cross-sectional shapes of the guideway 130, the mounting flange 132, and the attachment channel 134. From the perspective of the guiderail 110, the guideway 130, the mounting flange 132, and the attachment channel 134 extend continuously along the guiderail 110 to the end face 202. From the perspective of the guiderail adaptor 114, the guideway 130, the mounting flange 132, and the attachment channel 134 extend from the end face 202 continuously along the guiderail 110.

At one lateral end, the main housing 112A includes a wing-like support 204 for the guiderail adaptor 114. The support 204 projects from the main housing 112A normally thereto and distally supports the guiderail adaptor 114. The guiderail adaptor 114 includes a base 206 for the end face 202 and a multi-bracket 208 for the guiderail 110. The base 206 is oriented normally to the support 204 and is complementary to the end face 202. The multi-bracket 208 projects from the base 206 normally thereto and is complementary to the guiderail 110. As noted above, once the sunshade module 100 is mounted to the roof, the access plate 126 is removable from the remainder of the main housing 112A from below. The access plate 126 includes a wing-like extension 210 for the guiderail 110. The extension 210 projects from the access plate 126 normally thereto and is complementary to the mounting flange 132.

As shown, the multi-bracket 208 includes a cable plug 212 for the guideway 130, an elongate block-like first bracket 214 for the attachment channel 134, and an elongate block-like second bracket 216 for the mounting flange 132. The cable plug 212, the first bracket 214, and the second bracket 216 are oriented with the multi-bracket 208 and project side-by-side from the base 206. The cable plug 212 and the second bracket 216 are opposed from one another about the first bracket 214. The cable plug 212 is located inward toward the sunshade opening 104 and the second bracket 216 is located outward away from the sunshade opening 104. The first bracket 214 is located between the cable plug 212 and the second bracket 216, outward of the cable plug 212 and inward of the second bracket 216, and further inward toward the cable plug 212 than the second bracket 216. The cable plug 212 is complementary to the guideway 130. Moreover, the cable plug 212 is complementary to the cable 122 supported by the guideway 130. The first bracket 214 is complementary to the attachment channel 134. The second bracket 216 is complementary to the mounting flange 132.

As part of the multi-bracket 208, the cable plug 212 is pluggable into the guideway 130, the first bracket 214 is insertable into the attachment channel 134, and the second bracket 216 is disposable atop the mounting flange 132. During the assembly of the perimeter frame 102, with the guiderail adaptor 114 aligned with the guiderail 110, the base 206 is advanced to the end face 202. With the base 206 advanced to the end face 202, the base 206 engages the end face 202. As shown, the base 206 engages a portion of the end face 202 corresponding to the attachment channel 134 and a portion of the end face 202 corresponding to the mounting flange 132. As part of the multi-bracket 208, the cable plug 212, the first bracket 214, and the second bracket 216 project from the base 206 past the end face 202 to overlap the guideway 130, the mounting flange 132, and the attachment channel 134. Correspondingly, the cable plug 212 is plugged into the guideway 130, the first bracket 214 is inserted into the attachment channel 134, and the second bracket 216 is disposed atop the mounting flange 132. Moreover, as part of the access plate 126, the extension 210 is disposable underside the mounting flange 132. During the assembly of the perimeter frame 102, with the access plate 126 aligned with the remainder of the main housing 112A, the extension 210 is disposed underside the mounting flange 132 opposite the second bracket 216.

As shown with particular reference to FIG. 2A, the cable plug 212 supports the cable 122 for movement therealong. As noted above, the guiderail 110 and the main housing 112A support the cable 122 for movement therealong. Correspondingly, the guiderail 110 and the main housing 112A support the cable 122 for movement therebetween. With the guideway 130 supporting the cable 122 for movement along the guiderail 110, from inside the guideway 130, the cable plug 212 supports the cable 122 for movement between the guideway 130 and the main housing 112A.

As shown with particular reference to FIGS. 2A and 2C, with the first bracket 214 inside the attachment channel 134, the first fastener 200A is installed from above the attachment channel 134. With its installation, the first fastener 200A extends from atop the attachment channel 134 to the first bracket 214 through the attachment channel 134. From its position at the first bracket 214, the first fastener 200A is secured to the first bracket 214. In association therewith, from its position atop the attachment channel 134, the first fastener 200A engages the attachment channel 134 from above. For example, with a configuration typical of threaded fasteners, the first fastener 200A may include a head and a threaded shank projecting from the head. Correspondingly, the first bracket 214 may include a threaded retainer for the threaded shank. In this example, the threaded shank may extend through the attachment channel 134 and thread with the threaded retainer, and in association therewith, the head may engage the attachment channel 134 from above.

As shown with particular reference to FIGS. 2B and 2C, with the second bracket 216 atop the mounting flange 132, the second fastener 200B is installed from below the mounting flange 132. With its installation, the second fastener 200B extends from underside the mounting flange 132 to the second bracket 216 through the mounting flange 132. From its position at the second bracket 216, the second fastener 200B is secured to the second bracket 216. In association therewith, from its position underside the mounting flange 132, the second fastener 200B engages the mounting flange 132 from below. For example, with a configuration typical of threaded fasteners, the second fastener 200B may include a head and a threaded shank projecting from the head. Correspondingly, the second bracket 216 may include a threaded retainer for the threaded shank. In this example, the threaded shank may extend through the mounting flange 132 and thread with the threaded retainer, and in association therewith, the head may engage the mounting flange 132 from below.

Similarly, with the extension 210 underside the mounting flange 132, the third fastener 200C is installed from below the mounting flange 132. With its installation, the third fastener 200C extends from underside the extension 210 to the second bracket 216 through the extension 210 and the mounting flange 132. From its position at the second bracket 216, the third fastener 200C is secured to the second bracket 216. In association therewith, from its position underside the extension 210, the third fastener 200C engages the extension 210 from below. For example, with a configuration typical of threaded fasteners, the third fastener 200C may include a head and a threaded shank projecting from the head. Correspondingly, the second bracket 216 may include a threaded retainer for the threaded shank. In this example, the threaded shank may extend through the extension 210 and the mounting flange 132 and thread with the threaded retainer, and in association therewith, the head may engage the extension 210 from below.

With their installation, the first fastener 200A, the second fastener 200B, and the third fastener 200C secure the guiderail adaptor 114 to the attachment channel 134 and the mounting flange 132, and secure the access plate 126 to the mounting flange 132 together with the guiderail adaptor 114. As shown, using the first fastener 200A, the first bracket 214 is secured to the attachment channel 134. From inside the attachment channel 134, the first bracket 214 engages the attachment channel 134 from below. Using the second fastener 200B and the third fastener 200C, whether individually or contributorily, the second bracket 216 is secured to the mounting flange 132. From atop the mounting flange 132, the second bracket 216 engages the mounting flange 132 from above. Using the third fastener 200C, the extension 210 is secured to the mounting flange 132 together with the second bracket 216. From underside the mounting flange 132, the extension 210 engages the mounting flange 132 from below.

With the guiderail adaptor 114 secured to the attachment channel 134 and the mounting flange 132, the main housing 112A is secured to the guiderail 110 by the guiderail adaptor 114, and thereby connected to the guiderail 110. With respect to securing the guiderail adaptor 114 to the attachment channel 134 and the mounting flange 132, at the base 206, the guiderail adaptor 114 is advanced to the end face 202, and engages the end face 202. At the first bracket 214 and the second bracket 216, the guiderail adaptor 114 projects past the end face 202 to overlap the guiderail 110. Correspondingly, at the first bracket 214, the guiderail adaptor 114 is inserted into the attachment channel 134. Moreover, at the second bracket 216, the guiderail adaptor 114 is disposed atop the mounting flange 132. With the first bracket 214 and the second bracket 216 projecting side-by-side from the base 206, the guiderail adaptor 114 bifurcately projects past the end face 202 to overlap the attachment channel 134 and the mounting flange 132. Correspondingly, the guiderail adaptor 114 is bifurcately inserted into the attachment channel 134 and disposed atop the mounting flange 132. With the first bracket 214 inside the attachment channel 134, the guiderail adaptor 114 is secured to the attachment channel 134 by the first bracket 214. Moreover, at the first bracket 214, from inside the attachment channel 134, the guiderail adaptor 114 engages the attachment channel 134 from below. With the second bracket 216 atop the mounting flange 132, the guiderail adaptor 114 is secured to the mounting flange 132 by the second bracket 216. Moreover, at the second bracket 216, from atop the mounting flange 132, the guiderail adaptor 114 engages the mounting flange 132 from above.

Compared to existing configurations that contemplate securing the main housing 112A to the mounting flange 132, the guiderail adaptor 114 is advantageously secured to not only the mounting flange 132, but also the attachment channel 134. As shown, the guiderail adaptor 114 advantageously facilitates securement to the attachment channel 134 and the mounting flange 132 by bifurcately projecting past the end face 202 to overlap the attachment channel 134 and the mounting flange 132. Correspondingly, the guiderail adaptor 114 advantageously promotes both retaining the extruded construction of the guiderail 110 and maintaining the size of the guiderail 110. For example, by securing to the attachment channel 134, the guiderail adaptor 114 advantageously eliminates the need to partially remove the attachment channel 134 from the longitudinal end of the guiderail 110. At the same time, the guiderail adaptor 114 advantageously stably connects the main housing 112A to the guiderail 110. For example, by securing to the attachment channel 134, the guiderail adaptor 114 advantageously facilitates the connection of the main housing 112A to the guiderail 110 further inward toward the guideway 130 than the mounting flange 132, where the moments between the guiderail 110 and the main housing 112A are centered. For example, by securing to the attachment channel 134 and the mounting flange 132, and engaging the attachment channel 134 from below and the mounting flange 132 from above, the guiderail adaptor 114 advantageously counteracts the moments between the guiderail 110 and the main housing 112A.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A perimeter frame for a sunshade module, comprising:
   a sunshade opening;
   a guiderail, the guiderail including an end face, and a guideway, a mounting flange, and an attachment channel extending continuously along the guiderail to the end face, the guideway opening inwardly to the sunshade opening, the mounting flange projecting outwardly away from the sunshade opening, and the attachment channel opening downwardly from therebetween; and
   a housing, the housing including a guiderail adaptor, the guiderail adaptor inserted into the attachment channel, secured to the attachment channel using a fastener installed from above the attachment channel, and engaging the attachment channel from below.

2. The perimeter frame of claim 1, wherein the guiderail adaptor is disposed atop the mounting flange, secured to the mounting flange using a fastener installed from below the mounting flange, and engages the mounting flange from above.

3. The perimeter frame of claim 1, wherein the attachment channel has a lipped C-shaped cross-sectional shape.

4. The perimeter frame of claim 1, wherein the housing includes a support, the support projecting from the housing and distally supporting the guiderail adaptor.

5. The perimeter frame of claim 1, wherein the housing is a main housing for a drive system operable to deploy a sunshade supported by the perimeter frame relative to the sunshade opening.

6. A perimeter frame for a sunshade module, comprising:
   a sunshade opening;
   a guiderail, the guiderail including an end face, and a guideway, a mounting flange, and an attachment channel extending continuously along the guiderail to the end face, the guideway opening inwardly to the sunshade opening, the mounting flange projecting outwardly away from the sunshade opening, and the attachment channel opening downwardly from therebetween; and
   a housing, the housing including a guiderail adaptor, the guiderail adaptor bifurcately projecting past the end face to overlap the attachment channel and the mounting flange, and secured to the attachment channel and the mounting flange.

7. The perimeter frame of claim 6, wherein the guiderail adaptor is bifurcately inserted into the attachment channel and disposed atop the mounting flange, and engages the attachment channel from below and the mounting flange from above.

8. The perimeter frame of claim 7, wherein the guiderail adaptor is respectively secured to the attachment channel and the mounting flange using a first fastener installed from above the attachment channel and a second fastener installed from below the mounting flange.

9. The perimeter frame of claim 6, wherein the attachment channel has a lipped C-shaped cross-sectional shape.

10. The perimeter frame of claim 6, wherein the housing includes a support, the support projecting from the housing and distally supporting the guiderail adaptor.

11. The perimeter frame of claim 6, wherein the housing is a main housing for a drive system operable to deploy a sunshade supported by the perimeter frame relative to the sunshade opening.

12. A perimeter frame for a sunshade module, comprising:
   a sunshade opening;
   a guiderail, the guiderail including an end face, and a guideway, a mounting flange, and an attachment channel extending continuously along the guiderail to the end face, the guideway opening inwardly to the sunshade opening, the mounting flange projecting outwardly away from the sunshade opening, and the attachment channel opening downwardly from therebetween; and
   a housing, the housing including a guiderail adaptor, the guiderail adaptor including a base, and a first bracket and a second bracket projecting therefrom, the base advanced to the end face, and the first bracket and the second bracket respectively inserted into the attachment channel and disposed atop the mounting flange, secured to the attachment channel and the mounting flange, and engaging the attachment channel from below and the mounting flange from above.

13. The perimeter frame of claim 12, wherein the base engages a portion of the end face corresponding to the attachment channel.

14. The perimeter frame of claim 12, wherein the base engages a portion of the end face corresponding to the mounting flange.

15. The perimeter frame of claim 12, wherein the base engages a portion of the end face corresponding to the attachment channel and a portion of the end face corresponding to the mounting flange.

16. The perimeter frame of claim 12, wherein the first bracket and the second bracket are respectively secured to the attachment channel and the mounting flange using a first fastener installed from above the attachment channel and a second fastener installed from below the mounting flange.

17. The perimeter frame of claim 12, wherein the attachment channel has a lipped C-shaped cross-sectional shape.

18. The perimeter frame of claim 12, wherein the housing includes a support, the support projecting from the housing and distally supporting the guiderail adaptor.

19. The perimeter frame of claim 12, wherein the housing includes an access plate, the access plate including an extension projecting from the access plate, the extension disposed underside the mounting flange opposite the second bracket, secured to the mounting flange together with the second bracket using a fastener installed from below the mounting flange, and engaging the mounting flange from below.

20. The perimeter frame of claim 12, wherein the housing is a main housing for a drive system operable to deploy a sunshade supported by the perimeter frame relative to the sunshade opening.

* * * * *